United States Patent
Girard et al.

(10) Patent No.: US 8,127,064 B2
(45) Date of Patent: Feb. 28, 2012

(54) METHOD OF MANAGING THE SOFTWARE ARCHITECTURE OF A RADIO COMMUNICATION CIRCUIT, CORRESPONDING APPLICATION, COMPUTER PROGRAM PRODUCT AND CIRCUIT

(75) Inventors: Erwan Girard, Chatillon (FR); Jose Lourenco, Noisy le Grand (FR)

(73) Assignee: Wavecom, Issy les Moulineaux Cedex (FR)

( * ) Notice: Subject to any disclaimer, the term of this patent is extended or adjusted under 35 U.S.C. 154(b) by 368 days.

(21) Appl. No.: 12/441,090

(22) PCT Filed: Sep. 12, 2007

(86) PCT No.: PCT/EP2007/059601
§ 371 (c)(1),
(2), (4) Date: Jun. 24, 2009

(87) PCT Pub. No.: WO2008/031855
PCT Pub. Date: Mar. 20, 2008

(65) Prior Publication Data
US 2009/0318078 A1 Dec. 24, 2009

(30) Foreign Application Priority Data
Sep. 12, 2006 (FR) ...................................... 06 07968

(51) Int. Cl.
*G06F 13/26* (2006.01)
(52) U.S. Cl. ....................... 710/264; 712/244; 456/550.1
(58) Field of Classification Search .................... 455/39; 712/244; 710/260–264; 718/100–108; 719/310–332
See application file for complete search history.

(56) References Cited

U.S. PATENT DOCUMENTS
2005/0118995 A1 6/2005 Montes
(Continued)

FOREIGN PATENT DOCUMENTS
EP 1213648 6/2002
(Continued)

OTHER PUBLICATIONS

Nakamoto, Y.: "Toward Mobile Phone Linux", Design Automation Conference, 2004, proceedings of the ASP-DAC, 2004, Asia and South Pacific Yokohama, Japan, Jan. 27-30, 2004, Piscataway, NJ, USA, IEEE-Jan. 27, 2004.

(Continued)

*Primary Examiner* — Lana N Le
*Assistant Examiner* — Golam Sorowar
(74) *Attorney, Agent, or Firm* — David D. Brush; Westman, Champlin & Kelly, P.A.

(57) ABSTRACT

A method of managing the software architecture of a radio communication circuit is provided. The software architecture includes a radio communication software stack and at least one client application. The radio communication software stack includes a radio communication interrupt manager and at least one radio communication task. The client application includes at least one client task. The method includes interleaving, within the radio communication software stack, at least one client interrupt manager, included in the client application, and belonging to the group comprising: a first client interrupt manager of execution priority level that is higher than the at least one radio communication task and lower than the radio communication interrupt manager; and a second client interrupt manager of execution priority level that is higher than the at least one radio communication task and higher than the radio communication interrupt manager.

19 Claims, 5 Drawing Sheets

U.S. PATENT DOCUMENTS

2005/0119995 A1* 6/2005 Lee .................................. 707/3

FOREIGN PATENT DOCUMENTS

| FR | 2760922 | 9/1998 |
| WO | 03030572 | 4/2003 |

OTHER PUBLICATIONS

WAVECOM: "Open AT OS Presentation", Online 2005. pp. 1-37, Internet, Jun. 17, 2007.

French Search Report of Foreign Counterpart Application No. 06/07968 filed on Sep. 12, 2006.

International Search Report of Counterpart Application No. PCT/EP2007/059601 filed on Sep. 12, 2007.

English Translation of the International Preliminary Report on Patentability and Written Opinion of Counterpart Application No. PCT/EP2007/059601 filed on Sep. 12, 2007.

* cited by examiner

METHOD OF MANAGING THE SOFTWARE ARCHITECTURE OF A RADIO COMMUNICATION CIRCUIT, CORRESPONDING APPLICATION, COMPUTER PROGRAM PRODUCT AND CIRCUIT

CROSS-REFERENCE TO RELATED APPLICATIONS

This application is a Section 371 National Stage Application of International Application No. PCT/EP2007/059601, filed Sep. 12, 2007 and published as WO 2008/031855 on Mar. 20, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of disclosure is that of radio communication systems which use interruptions, corresponding to asynchronous events, to make the physical synchronization between various radio communication devices.

By radio communication devices (also called radio communication terminals or wireless terminals), it is meant all devices or means that are capable of exchanging signals using a radio communication system installed for example in machines or vehicles (M2M—"Machine to Machine" and automobile markets).

The field of application of the disclosure covers all cellular (GSM, 3G, 4G, DECT, CDMA, Wi-Max) or point to point (Wi-Fi, Bluetooth, Zigbee) radio communication technologies.

More precisely, the disclosure relates to a technique for managing the software architecture of a radio communication circuit, in the case where this software architecture comprises a radio communication software stack which supports the execution capacity of at least one client application, which is to say the third party code in comparison with the code of the main radio communication application (firmware) which manages the radio communication software stack (GSM stack for example).

The disclosure especially applies, but not exclusively, to cases where the radio communication circuit is an electronic radio communication module designed to be integrated into a radio communication device. This may concern for example a module from the "WISMO" (registered trade mark) family by WAVECOM (the party which registered the present patent application). WAVECOM has indeed for several years proposed an approach which overcomes a certain number of these disadvantages, consisting of grouping into a single module (called electronic radio communication module), all or at least most of the functions of a digital radio communication device. Such a module is in the form of a single housing, preferably shielded, that may be integrated directly by device manufacturers, without having to take account of a multitude of components. This module, (still sometimes called "macro component") is in fact formed by a group of several components on a substrate, so that they may be installed in the form of a single element. It comprises the essential components (especially a processor, memories, and software) required for the operation of a radio communication device which uses radio electrical frequencies. Therefore this eliminates the complex design steps, and their validation. The space required simply needs to be reserved for the module. Such a module thus permits the easy, quick and optimized integration of all components in wireless terminals (mobile telephones, modems, or any other device that uses a wireless standard).

In one variant of application of the disclosure, the radio communication circuit is not a radio communication module in the above sense but a printed circuit that is part of a radio communication device and onto which a set of electronic components are directly installed, whose purpose is to provide the various radio communication functions required, from receiving an RF signal to generating an audible signal (for a radio-telephone), and inversely.

BACKGROUND OF THE DISCLOSURE

The prior art discloses radio communication circuits which permit client applications to be integrated.

Purely by way of illustration, the disadvantages of the prior art are presented below in the case where the radio communication circuit is an electronic radio communication module. This concerns for example a module from the "WISMO" family (registered trade mark) which uses the "Open AT" concept (registered trade mark) of WAVECOM (the party which registered the present patent application). It is obvious that these disadvantages may be transposed to the case of the above-mentioned variant of the application.

According to a first known technique, no real time capacity is provided for the client application integrated into the radio communication module. Indeed, in a radio communication module, the execution of a radio communication software stack (GSM/GPRS stack for example) requires real time response times to interruptions from the radio part of the platform of this radio communication module (GSM/GPRS platform for example). If the module does not take into account this interruption within a very limited time, it loses the synchronization with the network. Consequently, the module is no longer able to make/receive calls, send/receive SMS, USSD . . .

As a reminder, and in the specific case of a GSM/GPRS stack, it is essential to ensure that it operates correctly in the following modes:

disconnected: the module is not connected to the GSM/GPRS network and therefore may not make any communications;

rest (IDLE): the module is connected to the GSM/GPRS network. It is therefore able to receive or make calls, send/receive SMS messages or start a GPRS connection, but it does not use any of these possibilities, connected: the module makes/receives calls, send/receive SMS/USSD, GPRS transfer: the module sends/receives data on the GPRS connection, searching for the network: the module has lost the synchronization with the network (switching on/zone not covered) but is searching for a network to synchronize.

As it is not known what the impact of the execution of the client application processes will have on the operation of their own radio communication software stack and therefore on the overall operation of their product, the radio communication module manufacturers (especially those aimed at the M2M and automobile markets) do not provide their clients with the capacity to integrate processes whose execution in real time is critical for the correct operation of the finished product.

According to a second known technique, the suppliers of radio communication software stacks (GSM/GPRS/EDGE/ 3G stacks for example) provide a code which compiled and executed on an associated platform (GSM/GPRS platform for example) permits calls to be made/received . . . These software solution providers thus permit their clients to execute a very low level code, a code which could therefore allow processes to be integrated whose real time execution is critical. However under no circumstances do they then guarantee that the radio communication software stack will operate correctly. Furthermore, this implies a very complex design of the client application and consequently a very high level of expertise in the field of radio communications (GSM/GPRS for example).

For these reasons, this second alternative technique is difficult to use, especially by clients in the M2M markets and even more so by anyone who is not an expert both in the fields of the final application of the overall product and in the field of telecommunications, especially GSM/GPRS technologies.

Consequently, the majority of the software architectures that permit external code to be integrated onto a radio communication platform (Wireless platform) comply with the first known technique and are defined as described by FIG. 1. This software architecture typically comprises a radio communication software stack (in the example of FIG. 1, a GSM stack) comprising:

a radio communication interrupt manager 1 ("GSM Stack IT Handler"), which provides Physical Link Services) and provides the synchronization with GSM network. It is the GSM physical layer;

a set of tasks 2 specific to the GSM stack (GSM Stack Tasks L1-L3"), distributed in layers (L1 to L3), which provide a logical Link and Control Service. In the GSM standard, this corresponds to L1/L2/L3, RR/LAPD/MM/CCRLC/MAC/LLC/SNDCP/SM;

a set of tasks 3 related to AT commands (GSM AT Commands Task"), which provide a GSM stack control service. In the GSM standard, this corresponds to the Application layer; and a task 4 called Idle Task which is executed when no other task uses the CPU resource.

This software architecture further comprises a client application 5 (in this example an Open AT application), comprising a set of client tasks. In the GSM stack, this client application 5 is positioned between the set of tasks related to AT commands and the idle task 4. The arrow ref. 6 shows an indicative reaction time scale (from approximately 1 ms up to approximately 10 ms). The arrow ref. 7 shows a priority level scale (from the idle task 4, which has the lowest priority, up to the radio communication interrupt manager 1, which has the highest priority).

This software architecture may also be broken down into two fields:

a field 8 for managing the interruptions, which comprises the radio communication interrupt manager 1; and a field 9 for managing the tasks, which comprises all of the above-mentioned tasks (tasks 2 specific to the GSM stack, tasks 3 related to AT commands, idle task 4 and client application tasks 5).

Therefore, with this structure, any client application may be executed by the module whilst guaranteeing the correct operation of the GSM/GPRS stack. Nevertheless, no real time capacity may be guaranteed for this client application.

Currently, as illustrated in FIG. 2, a processor (not shown) inside the module 24 executes a main radio communication application 24 which manages the radio communication software stack (GSM stack for example). In order to overcome the absence of real time capacity for the client application 25 that is also executed by the module (by means of the internal processor mentioned above), it is necessary to use and install n the mother board 21 of the radio communication device, an additional processor 22 (for example a micro controller) and an additional memory 23, which are external to the radio communication module 24 and which allow client processes to be executed, for which real time execution is critical. Furthermore, in this example, the micro controller 22 is connected to a external device connector 26, via Input/Output interfaces for various uses (GPIOs) 27, SPT type (Serial Peripheral Interface) serial interfaces (SPI1, SPI2) 28 and 29, a USB interface 210 and a connection transporting the interruptions (IT) 211.

These additional elements (micro controller and memory) increase the complexity and manufacturing cost of the radio communication device.

There is therefore a need to offer a real time capacity for the client application executed by the module, in order to eliminate the need for an additional processor and an additional memory, external to the radio communication module.

SUMMARY

In one specific embodiment of the invention, a method of managing the software architecture of a radio communication circuit is proposed, wherein said software architecture comprises a radio communication software stack and at least one client application, wherein said radio communication software stack comprises a radio communication interrupt manager and at least one radio communication task, wherein said client application comprises at least one client task. The method comprises a step for interleaving, in said radio communication software stack, at least one client interrupt manager, that is part of said client application and belonging to the group comprising a first client interrupt manager with an execution priority level that is higher than said at least one radio communication task and lower than said radio communication interrupt manager;

a second client interrupt manager with an execution priority level that is higher than said at least one radio communication task and higher than said radio communication interrupt manager.

The general principle of an embodiment of the invention therefore consists of defining a new software architecture, by adding to the radio communication stack at least one client interrupt manager, which has an execution priority level that is lower or higher than that of the radio communication interrupt manager, and higher than that of the radio communication tasks. In other terms, by means of the client interrupt manager, developers of client application (designed to be executed by the circuit) are offered access to the low level hardware resources in order to respect the first critical temporal constraints (for example a reaction time of less than 1 ms). Consequently, it is guaranteed that the client application may process interruptions in real time, without endangering the correct operation of the radio communication stack.

Advantageously, said client application comprises at least two client task sub-assemblies, which each comprise at least one client task. Furthermore, the method comprises a step for managing said at least two client task sub-assemblies permitting, in said radio communication software stack, to separate said at least two client task sub-assemblies by at least one radio communication task.

Therefore, within the field of task management (part of the stack related to the tasks), certain client tasks have an execution priority level that is higher than others, which permits these client tasks to be executed whilst respecting second critical temporal constraints (for example a reaction time of between 1 ms and 10 ms), lower than the first ones mentioned above.

Advantageously, at least one of client task sub-assemblies comprises a specific client task forming a third client interrupt manager which receives at least one interruption by means of at least one of said first and second client interrupt managers or another third client interrupt manager with an execution priority level that is higher than said third client interrupt manager.

Consequently, a client application may comprise several client interrupt managers, which have different levels of execution priority and which are interleaved, in the radio communication stack, between different radio communication tasks. These client interrupt managers are organized into a cascade, by sending interruptions (in decreasing order of the execution priority levels).

Advantageously, said client interruptions belong to the group comprising:

client interruptions external to said radio communication circuit; and client interruptions internal to said radio communication circuit, comprising interruptions from a clock register that is part of said radio communication circuit.

According to one advantageous feature, the maximum duration of execution of at least one critical process required for the design of at least one of said first and second client interrupt managers and/or at least one of said client tasks is pre-determined.

In one advantageous embodiment of the invention, the method comprises a step for controlling the duration of the execution of at least one of said first and second client interrupt managers and/or at least one of said client tasks, thus guaranteeing that said the execution duration does not exceed a maximum determined duration.

In one specific embodiment of the invention, said circuit is an electronic radio communication module designed to be integrated into a radio communication device.

In another specific embodiment, the invention relates to a computer program product that may be downloaded from a communication network and/or saved to a support that may be read by a computer and/or executed by a processor. This computer program product comprises program code instructions for the execution of the steps of the above mentioned method, when said program is executed on a computer.

In yet another embodiment, the invention relates to a radio communication circuit, comprising means of managing a software architecture comprising a radio communication software stack and at least one client application, wherein said radio communication software stack comprises a radio communication interrupt manager and at least one radio communication task, wherein said client application comprises at least one client task. The circuit comprises means of interleaving, in said radio communication software stack, at least one client interrupt manager, included in said client application, and belonging to the group comprising:

a first client interrupt manager with an execution priority level that is higher than said at least one radio communication task and lower than said radio communication interrupt manager;

a second client interrupt manager with an execution priority level that is higher than said at least one radio communication task and higher than said radio communication interrupt manager.

The various interleaving means mentioned above are for example software elements resulting from the execution, by a processor in the circuit, of the main radio communication application (generally called "firmware").

More generally, the circuit according to the invention comprises means of implementing the method of managing the software architecture, as previously described (in any of the various embodiments).

BRIEF DESCRIPTION OF THE DRAWINGS

Other features and advantages of embodiments of the invention will become clearer upon reading the following description of a preferred embodiment of the invention, provided by way of example and in no way restrictively (all of the embodiments of the invention are not limited to the features and advantages of this preferred embodiment), and appended drawings, among which.

DETAILED DESCRIPTION OF ILLUSTRATIVE EMBODIMENTS

In all of the figures of the present document, identical elements are designated by a same numerical reference.

Figure 1:
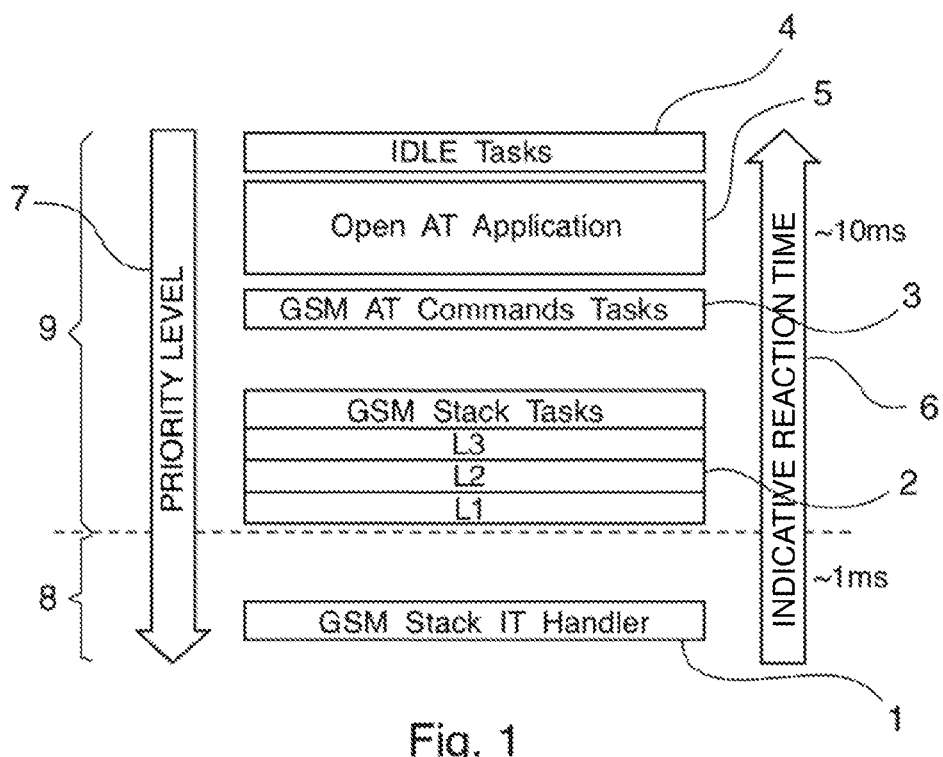
FIG. 1 shows a known software architecture, of a GSM stack supporting the execution capacity of a client application, with no real time capacity for this client application.
Figure 2:
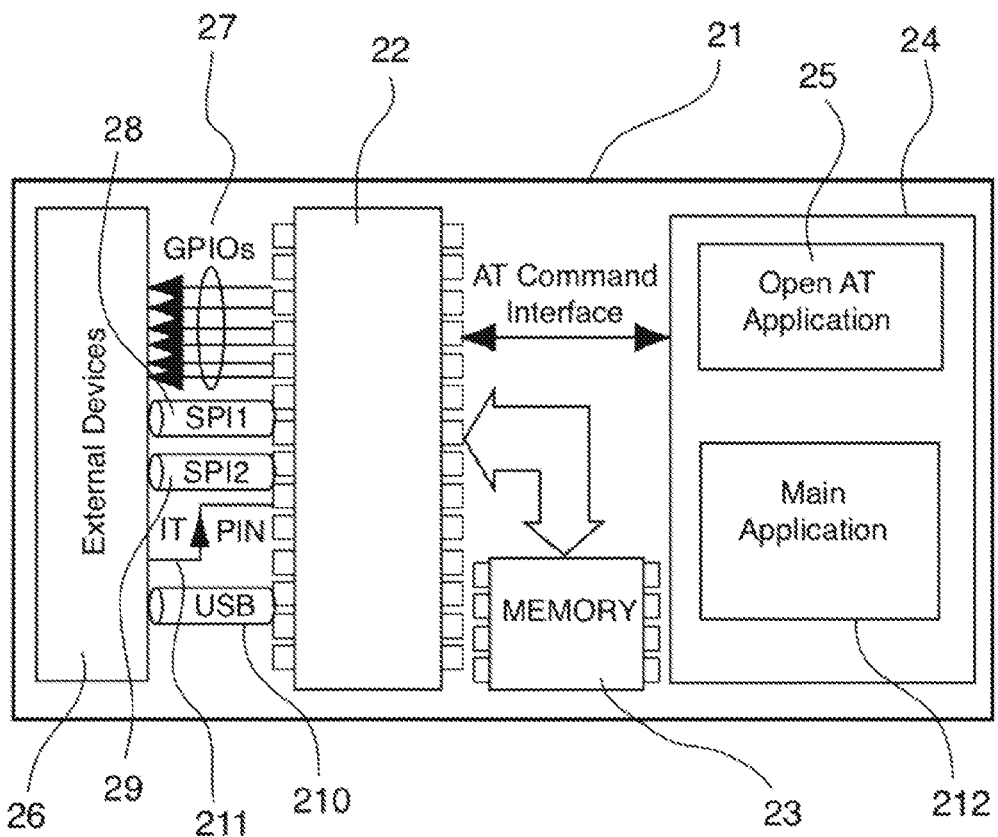
FIG. 2 shows a radio communication device according to the prior art, comprising a radio communication module with software architecture according to FIG. 1.

FIGS. 1 and 2 relate to the prior art and have already been described above.

Figure 3A:
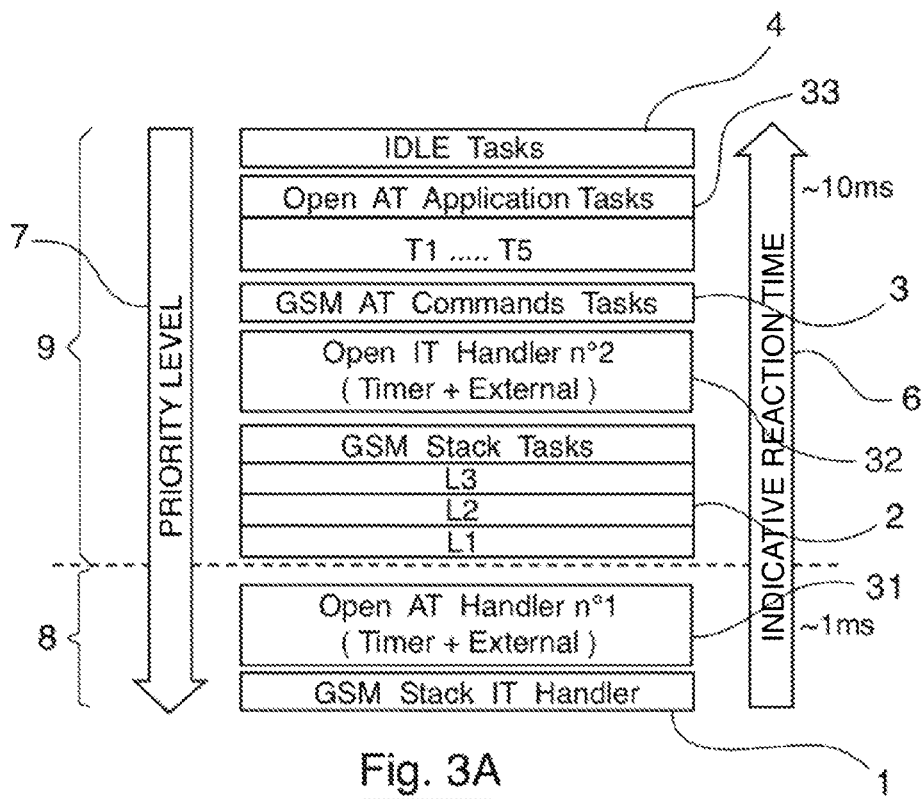
FIGS. 3A, 3B, and 3C each show a software architecture respectively according to a first, second and a third specific embodiment of the invention, of a GSM stack supporting the execution capacity of a client application, with real time capacity for this client application.

Now in relation to FIG. 3A, a software architecture according to a first specific embodiment of the invention will be presented, of a GSM stack supporting the execution capacity of a client application, with real time capacity for this client application.

In this first specific embodiment, the invention consists of providing the users of the "OPEN AT" environment with the capacity to execute the code that is not part of the GSM/GPRS stack (which is to say a client application) on a GSM/GPRS hardware platform, at a very high level of priority (which allows processes to be executed whose execution in real time is critical), whilst guaranteeing the correct operation of the GSM/GPRS stack in the various embodiments mentioned above.

A reminder is made that the "OPEN AT" concept is such that, in addition to the main radio communication application which manages a radio communication software stack (GSM stack for example), a radio communication module (for example from the "WISMO" family) executes at least one client application.

In this first specific embodiment of the invention, the software architecture comprises a GSM stack and a client application.

The GSM stack is of the standard type and identical to that already described above in relation to FIG. 1. It therefore comprises a radio communication interrupt manager 1 ("GSM Stack IT Handler"), a set of tasks 2 specific to the GSM stack ("OSM Stack Tasks L1-L3"), a set of tasks 3 related to AT commands ("GSM AT Commands Task") and an idle task 4.

In return, the client application of FIG. 3 is distinguished from that of FIG. 1 in that it is not one piece but comprises:

a first client interrupt manager (Open AT IT Handler n°1) 31, managed so that it is interleaved between the radio communication interrupt manager 1 and the set of tasks 2 specific to the GSM stack;

a specific client task forming a second client interrupt manager (Open AT IT Handler n°2) 32, managed so that it is interleaved between the set of tasks 2 specific to the GSM stack and the set of tasks 3 related to AT commands; and a set of client tasks ("Open AT Application Tasks T1 . . . T5), managed so that they are interleaved between the set of tasks 3 related to AT commands and the idle task 4.

With respect to the architecture of the prior art described in FIG. 1, this architecture permits the client to execute code at the level of the first and second client interrupt managers references 31 and 32.

Figure 3B:
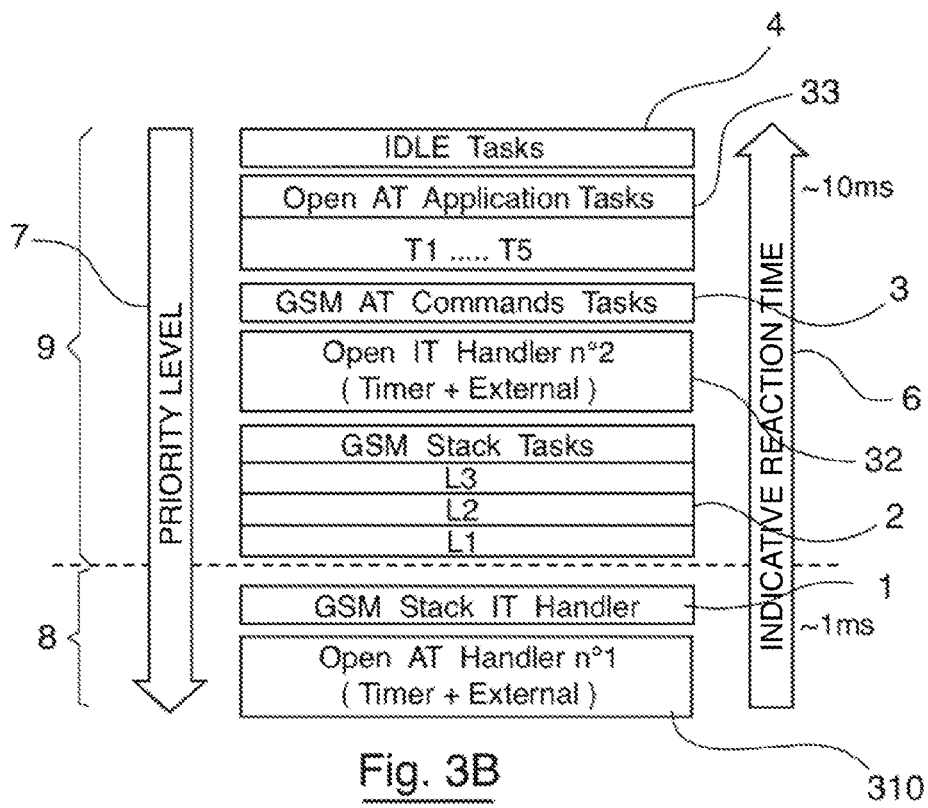
Figure 3C:
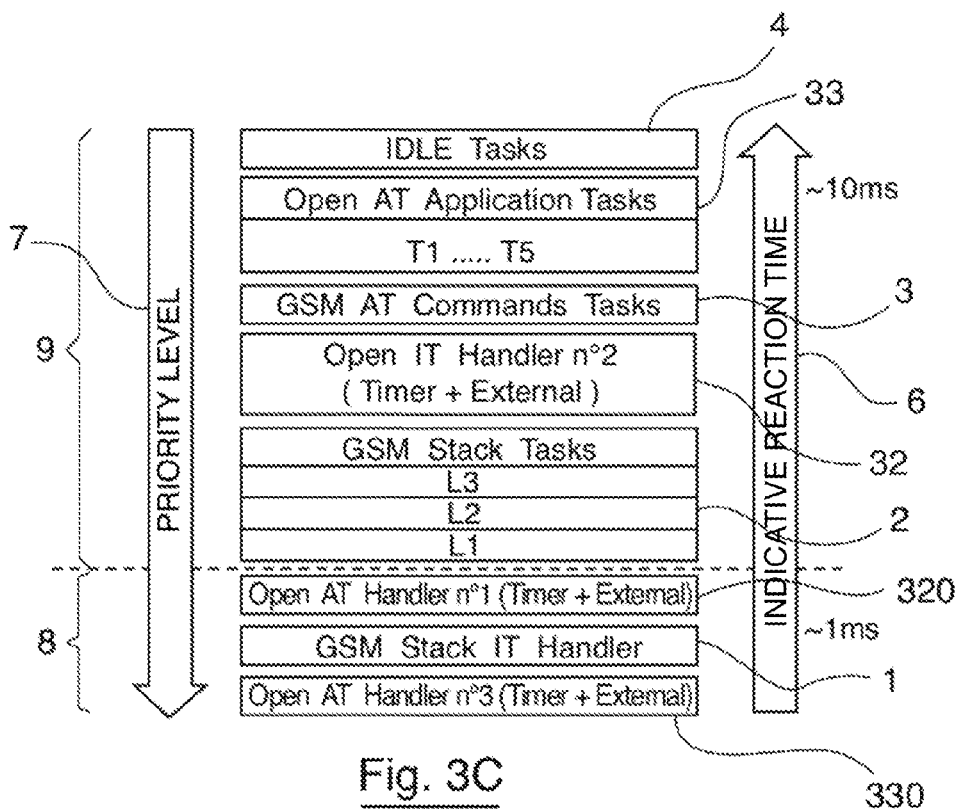

It is obvious that different variants of this example may be envisaged: with a single client interrupt manager or with more than two client interrupt managers, and/or with the client interrupt manager(s) interleaved(s) differently in the GSM stack, especially as illustrated in relation to FIGS. 3B and 3C.

The execution of the code implemented in these first and second client interrupt managers is triggered by an interruption, which may be external to the module, or internal for the clock register (Hardware timer). This permits the execution in real time of asynchronous processes. The advantage of this solution is the inter-correlation between the taking into account of the real time requirements of the GSM stack to remain synchronized with the network and the real time execution requirements of any type of client processing (which may be very long), without endangering this synchronization to the network.

Furthermore, the maximum duration of execution of the critical processes required to design the code to be executed at the level of the first and second client interrupt managers 31, 32 and client tasks 33 is pre-determined. This involves for example:

the duration of non-interruptibility (interruption latency);
Scheduling time;
the time for writing in non volatile memory;
the time for allocating a storage zone in volatile memory;
the time for positioning the acquisition of values on the BUS' and OPIOs of the platform;
the time to switch between the active (normal) and inactive (sleep) modes;
the time to switch between the standard (26 MHz) and Boost 104 MHz modes;

Now in relation to FIG. 3B, a software architecture is presented according to a second specific embodiment of the invention, of a GSM stack supporting the execution capacity of a client application, with real time capacity for this client application.

Differently from the client application of the first embodiment, the client application of the second specific embodiment comprises:

a first client interrupt manager (Open AT IT Handler n°1) 310, managed so that it has an execution priority level that is higher than the radio communication interrupt manager 1;

a specific client task forming a second client interrupt manager 4 (Open AT IT Handler n°2) 32, managed so that it can be interleaved between the set of tasks 2 specific to the GSM stack and the set of tasks 3 related to AT commands; and a set of client tasks ("Open AT Application Tasks T1 . . . T5), managed so that they are interleaved between the set of tasks 3 related to AT commands and the idle task 4.

Consequently, the software architecture according to this second specific embodiment is distinguished from that according to the first specific embodiment of FIG. 3A in that the first client interrupt manager (Open AT IT Handler n°1) 31 has an execution priority level that is higher than the radio communication interrupt manager 1.

Consequently, in this second specific embodiment, the users of the "OPEN AT" environment have the capacity to execute code that is not part of the GSM/GPRS stack (which is to say a client application) on a GSM/GPRS hardware platform, at a priority level that is higher than that of the GSM/GPRS stack (which allows processes to be executed for which the real time execution is critical), whilst guaranteeing the correct operation of the GSM/GPRS stack in the various embodiments mentioned above.

The other operating features remain identical to those described during the presentation of the software architecture of the first embodiment in relation to FIG. 3A.

A software architecture according to a third specific embodiment of the invention, in relation to FIG. 3C, is now presented, of a GSM stack supporting the execution capacity of a client application, with a real time capacity for this client application.

The software architecture according to this third specific embodiment integrates first 320 and second 330 client interrupt managers which each have an execution priority level that is higher than that of the set of tasks 2 specific to the GSM stack.

Therefore, differently to the client application of the first and second specific embodiments of the invention, the client application of FIG. 3C comprises:

a first client interrupt manager (Open AT IT Handler n°3) 330, managed so that it has an execution priority level that is higher than the radio communication interrupt manager 1;

a second client interrupt manager (Open AT IT Handler n°1) 320, managed so that it can be interleaved between the radio communication interrupt manager 1 and the set of tasks 2 specific to the GSM stack;

a specific client task forming a third client interrupt manager (Open AT IT Handler n°2) 32, managed so that it can be interleaved between the set of tasks 3 related to AT commands; and a set of client tasks ("Open AT Application Tasks T1 . . . T5), managed so that they can be interleaved between the set of tasks 3 related to AT commands and the idle task 4.

Therefore, thanks to this software architecture, a user may use the first client interrupt manager (Open AT IT Handler n°3) 330 and the second client interrupt manager (Open AT IT Handler n°1) 320, depending on the interruption response time required.

Therefore, for example, if the user wishes to obtain a response time of less than 20 μs, he may integrate the code of the client application in the first client interrupt manager 330, and if he is satisfied with a response time for example of 1 ms (other values may also be envisaged, for example 600 µs), he may place the code of the client application in the second client interrupt manager 320.

Figure 4:
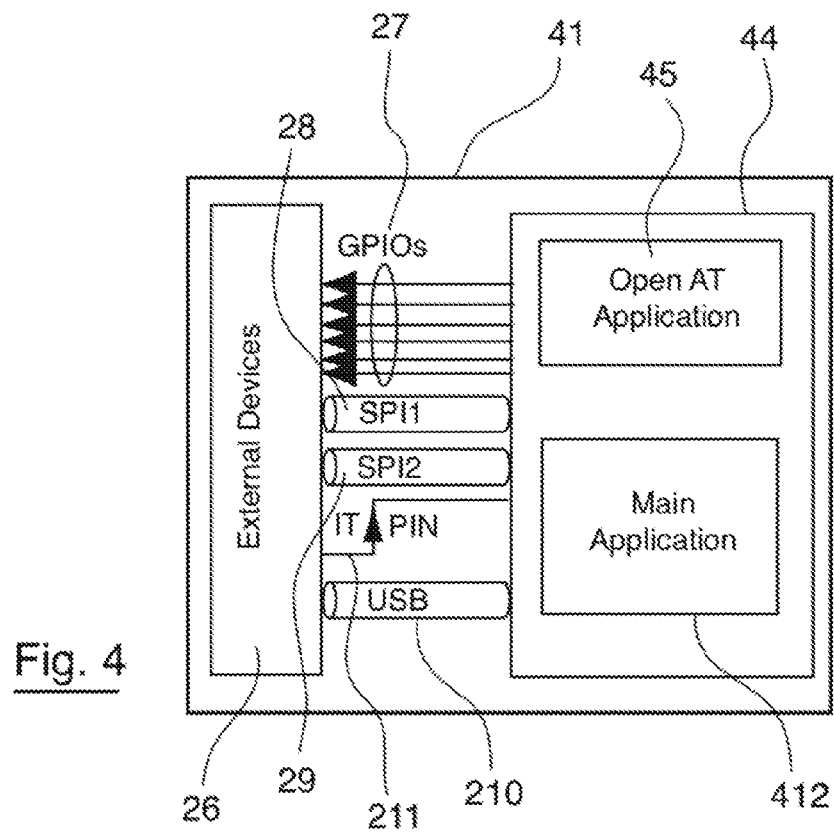
FIG. 4 shows a specific embodiment of a radio communication device according to the invention, comprising a radio communication module with software architecture according to any of FIG. 3A, 3B or 3C.

Now in relation to FIG. 4, a specific embodiment of a radio communication device according to the invention is presented.

It comprises a mother board 41 onto which are implanted a radio communication module 44 which has software architecture according to any of FIG. 3A, 3B or 3C, obtained by the execution by a processor (not shown) of:

a main radio communication application 42 which manages the radio communication software stack (GSM stack for example) and permits the implementation of the method of an embodiment of the invention, permitting the software architecture of the embodiment of the invention to be obtained (wherein the client application is distributed within the stack); and a client application 45 of which the different parts are distributed within the GSM stack, as described above in relation to any of FIG. 3A, 3B or 3C.

Given that a real time capacity is offered to the client application 45, no additional element (or micro controller or memory), that is external to the module, is required on the mother board 41.

Furthermore, the radio communication module 44 is connected to an external device connector 26, via the same interfaces and connections as those already described in FIG. 2 (between this same connector 26 and the external micro controller 22).

Figure 5A:
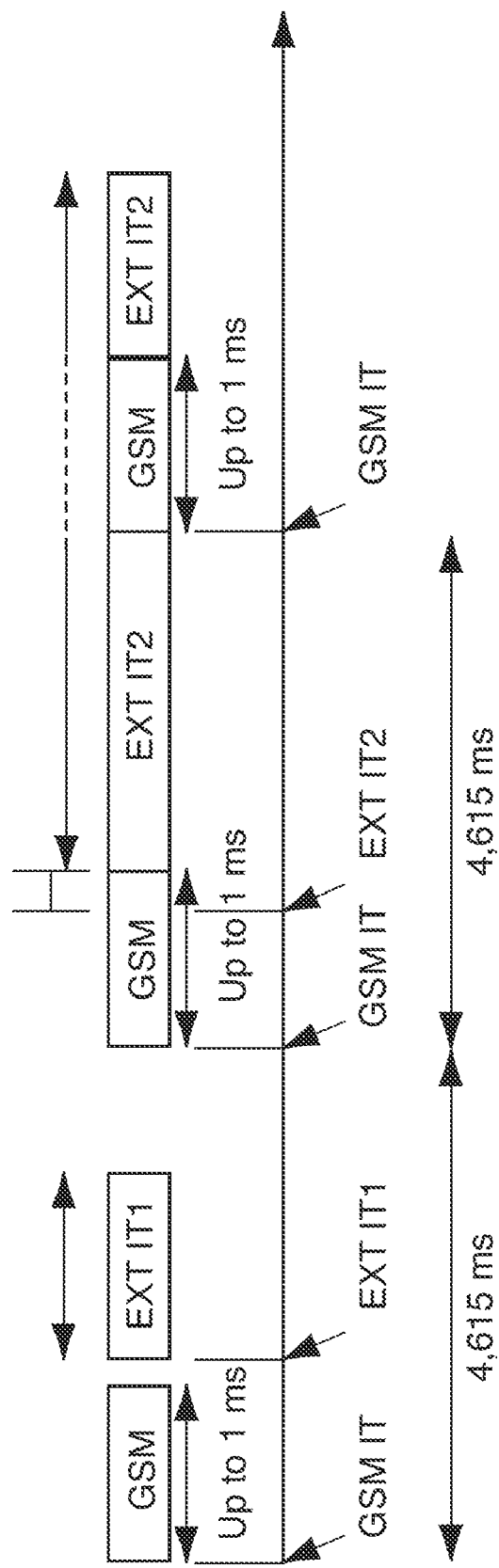
FIG. 5A illustrates an example of the use of the example of software architecture according to an embodiment of the invention of FIG. 3A.

An example of the use of the example of software architecture according to the embodiment of the invention of FIG. 3A, in relation to FIG. 5A, will now be presented.

This example concerns:

the acquisition of a current value by a sensor in a limited and defined time, after which the value provided by the sensor will no longer be of value (for example 2 ms); the sensor which positions an interruption at the precise time where the value is available.

this value (measurement) is acquired for the calculation of the instantaneous consumption, of the average over several days and the storing of the result in the memory asynchronously.

these calculation and storage operations must be carried out at each interruption positioned by the sensor and independently from the GSM modes in which the module is in.

weekly, the entire system sends by GPRS the complete measurement report (including for example several hundreds of punctual measurements).

The following steps lay be distinguished:

1. Detection of an interruption positioned by the sensor signifying that the measurement is ready to be acquired on any bus of the platform.

2. Triggering of the client code designed to acquire this measurement in a guaranteed time of less than 2 ms (otherwise the measurement is no longer of value), wherein this code is executed at the level of the first interrupt manager (Open AT IT Handler n°1).

3. Acquisition in the first client interrupt manager (Open AT IT Handler n°1) of the measurement and storage in the volatile memory (very rapid process, several µs).

4. Notification by the first interrupt manager (Open AT IT Handler n°1) to the second client interrupt Manager (Open AT IT Handler n°2) that the measurement has been acquired and stored in the volatile memory at a given location.

5. Activation of the second client Interrupt manager following the measurement notification sent by the first interrupt manager. Acquisition of the instantaneous value and execution of the instantaneous and average consumption calculations in the second client interrupt manager (Open AT IT Handler n°2). Storage of the results of these calculations in flash memory (very long operations, several hundreds of ms).

6. Return to a "normal" state: waiting for an interruption to acquire an instantaneous value.

7. Each week, when the alarm that the Open AT client task (Open AT Application Tasks T1) has positioned on "1 week" trips, this task (Open AT Application Tasks T1) will search in the location defined the complete report that has been acquired, formatted and stored by the second interrupt manager following the instantaneous measurements acquired in a time limited by the first interrupt manager.

8. Once the report has been acquired, the Open AT client task initiates a GPRS connection and sends the report and deletes it from the memory once it has been sent. It is possible during this phase that the first and second managers interrupt these tasks ("OPEN AT Application Task T1" and "GSM Stack Tasks") to acquire new values.

The actions described in steps 7 and 8 are synchronous (they are repeated predicatively every week, once a week) and do not require in any case real time as the receipt of the report on a weekly basis by the client infrastructure give or take two minutes does not change anything as concerns the quality of the report and its subsequent use. Therefore these actions are executed by the low priority task (Open AT Application Tasks T1). On the contrary, the quality of the report depends on the quality of the instantaneous measurements which are only valid if they are acquired in less than 2 ms. In this case there is a need for a guaranteed response time. This is why the measurements are acquired by the first interrupt manager (Open AT IT Handler n°1).

Finally, the sending of the report by GPRS could modify the acquisition time of this instantaneous measurement as this makes the GSM stack work. For this, the client requires the real time architecture proposed by an embodiment of the invention as only the latter may guarantee the quality of the measurements regardless of the action that the system carries out.

If these operations 1 to 8 are carried out in disconnected mode, they are carried out sequentially as the GSM/GPRS stack does not run.

If the module is in one of the modes specified above (any one), step 2 is guaranteed as the software architecture according to an embodiment of the invention guarantees that the processing of an interruption ("GSM IT") from the radio part of the module does not last more than 1 ms regardless of the mode in which the module is.

Step 3 (processing of the client interruption "EXT IT 1") only starts when the interruption from the radio part ("GSM IT") is processed, or this step 3 will be interrupted by the processing of this interruption. This guarantees that the synchronization with the network is maintained regardless of the asynchronous processing to be carried out in real time by the client application. Moreover, the module manufacturer guarantees the maximum time required for the allocation of a storage zone in volatile memory regardless of the GSM state of the module. This guarantees that the measurement may be stored less than 2 ms after the interruption notifying the need to acquire this measurement is triggered.

Step 4 (processing of the client interruption "EXT 1T2") only starts when the tasks of the GSM/GPRS stack have carried out the operations required to maintain the voice call, the sending/receiving of data on the GPRS link or the sending or receiving of an SMS, USSD . . .

This breakdown of tasks permits real time processes to be executed regardless of the state of GSM/GPRS part, whilst guaranteeing the correct operation of the stack.

Optionally, a control process permits a check that the client code in each of the first and second client interrupt managers (Open AT IT Handler n°1 and 2) are not executed for too long.

Figure 5B:
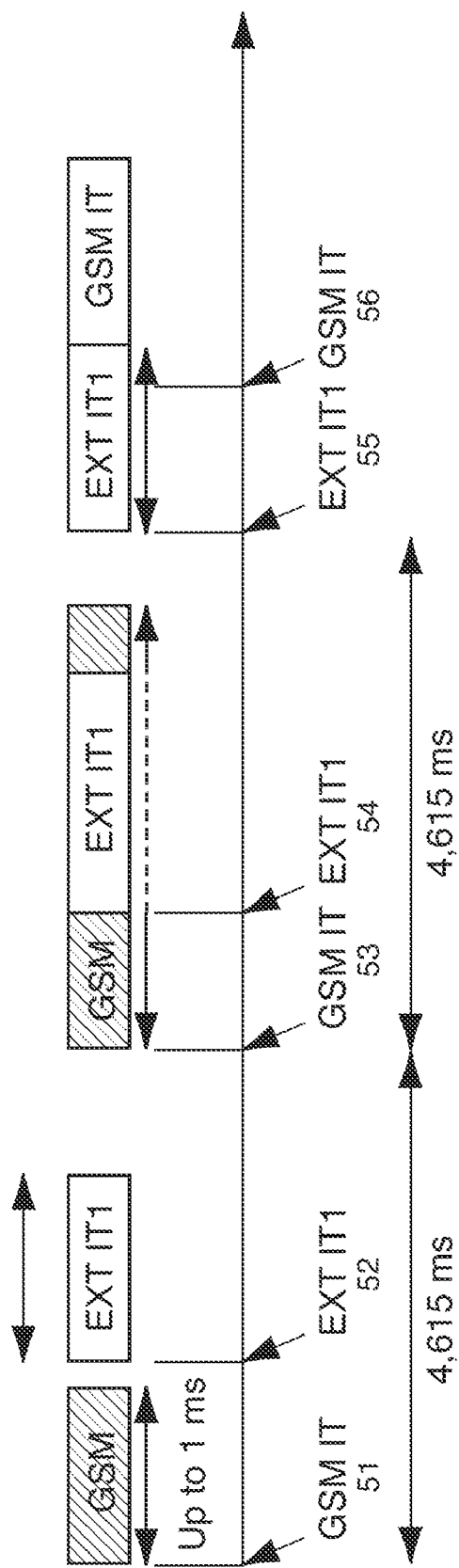
FIG. 5B illustrates an example of the use of the example of software architecture according to an embodiment of the invention of FIG. 3B.

Henceforth an example of use of the example of software architecture according to the embodiment of the invention of FIG. 38, in relation to FIG. 5B, will be presented.

In this example, it is supposed that a succession of tasks is executed by the radio communication module 44.

The following steps may be distinguished:

detection and processing of a first interruption "GSM IT" 51 from the radio communication interrupt manager 1 ("GSM Stack IT Handler"). The software architecture according to an embodiment of the invention guarantees that the processing of an interruption from the radio part of the module does not last more than 1 ms;

detection and processing of a first client interruption "EXT IT 1" 52 from the first client interrupt manager ("Open AT IT Handler n°1") 310, wherein a time passes between the end of the processing of the first interruption "GSM IT" 51 and the detection of the first client interruption "EXT IT 1" 52;

detection and processing of a second radio communication interruption "GSM IT" 53 from the radio communication interrupt manager 1;

detection and processing of a second client interruption "EXT IT 1" 54 from the first client interrupt manager 310. The processing of the second radio communication interruption "GSM IT" 53 is suspended in favour of the processing of the second client interruption "EXT IT 1" 54 which has a higher priority. When the processing of the second client interruption "EXT IT 1" 54 is complete, the processing of the second radio communication interruption "GSM IT" 53 starts again until it is complete;

detection and processing of a third client interruption "EXT IT 1" 55 from the first client interrupt manager 310. During the processing of the third interruption client "EXT IT 1" 55, a third radio communication interruption "GSM IT" 56 is detected. However, the processing of this third radio communication interruption "GSM IT" 56 will only start when the processing of the third client interruption "EXT IT 1" 55 is complete.

It is therefore possible that certain radio communication interruptions from the radio communication interrupt manager 1 may be offset in time in favour of client interruptions from the first client interrupt manager 310 that has a higher priority.

In at least one embodiment, a technique is provided for managing the software architecture of a radio communication circuit, permitting a client application to be executed that is not integrated into the radio communication stack, at a very high priority level (which allows processes to be executed for which the execution in real time is critical), whilst guaranteeing the correct operation of this radio communication stack.

At least one embodiment provides such a technique, that is simple and inexpensive to implement.

In at least one embodiment, such a technique allows the need for an additional processor and an additional memory to be eliminated, which are external to the radio communication circuit.

In at least one embodiment, such a technique may be implemented regardless of the quantity of processing required by the execution of the client application.

Although the present disclosure has been described with reference to one or more examples, workers skilled in the art will recognize that changes may be made in form and detail without departing from the scope of the disclosure and/or the appended claims.

The invention claimed is:

1. A method of managing a software architecture of a radio communication circuit, wherein said software architecture comprises a radio communication software stack and at least one client application, wherein said radio communication software stack comprises a radio communication interrupt manager and at least one radio communication task, wherein said client application comprises at least one client task, the method comprising:

interleaving, in said radio communication software stack, at least a first client interrupt manager that is part of said client application and that has an execution priority level that is higher than said at least one radio communication task and lower than said radio communication interrupt manager; and processing interruptions, wherein:

an interruption intended for the radio communication interrupt manager is entirely processed without the possibility of it being interrupted by an interruption intended for said first client interrupt manager;

an interruption intended for the first client interrupt manager is only processed when there are no other jobs in progress being processed by said radio communication interrupt manager, and the processing of said interruption by said first client interrupt manager is interrupted by an arrival of an interruption intended for said radio communication interrupt manager.

2. The method according to claim 1, wherein said radio communication interrupt manager comprises code such that the duration of execution of said radio communication interrupt manager is compatible with a real time execution of said first client interrupt manager.

3. The method according to claim 1, wherein said first client interrupt manager comprises code such that the duration of execution of said first client interrupt manager client is compatible with a correct execution of said at least one radio communication task.

4. The method according to claim 1, wherein said client application comprises at least two client task sub-assemblies, which each comprises at least one client task, and wherein the method comprises a step of managing said at least two client task sub-assemblies permitting, in said radio communication software stack, to separate said at least two client task sub-assemblies by at least one radio communication task.

5. The method according to claim 4, wherein at least one of said client task sub-assemblies comprises a specific client task forming a second client interrupt manager which receives at least one interruption by at least one of said first client interrupt manager or another second client interrupt manager with an execution priority level that is higher than said second client interrupt manager.

6. The method according to claim 1, wherein said client interruptions belong to the group consisting of:

client interruptions external to said radio communication circuit; and client interruptions internal to said radio communication circuit, comprising interruptions from a clock register that is part of said radio communication circuit.

7. The method according to claim 1, wherein the maximum duration of execution of at least one critical process required for the design of at least one of said first client interrupt manager and/or at least one of said client tasks is pre-determined.

8. The method according to claim 1, wherein the method comprises a step of controlling duration of execution of at least one of said first client interrupt manager and/or at least one of said client tasks, thus guaranteeing that the execution duration does not exceed a maximum determined duration.

9. The method according to claim 1, wherein said circuit is an electronic radio communication module designed to be integrated into a radio communication device.

10. Computer program product saved to a support that may be read by a computer and/or executed by a processor, wherein the product comprises program code instructions for execution of a method of managing a software architecture of a radio communication circuit, when said program is executed on a computer, wherein said software architecture comprises a radio communication software stack and at least one client application, wherein said radio communication software stack comprises a radio communication interrupt manager and at least one radio communication task, wherein said client application comprises at least one client task, the method comprising:
  interleaving, in said radio communication software stack, at least a first client interrupt manager that is part of said client application and that has an execution priority level that is higher than said at least one radio communication task and lower than said radio communication interrupt manager; and
  processing interruptions, wherein:
    an interruption intended for the radio communication interrupt manager is entirely processed without the possibility of it being interrupted by an interruption intended for said first client interrupt manager;
    an interruption intended for the first client interrupt manager is only processed when there are no other jobs in progress being processed by said radio communication interrupt manager, and the processing of said interruption by said first client interrupt manager is interrupted by an arrival of an interruption intended for said radio communication interrupt manager.

11. A radio communication circuit, comprising:
  means for managing a software architecture comprising a radio communication software stack and at least one client application, wherein said radio communication software stack comprises a radio communication interrupt manager and at least one radio communication task, wherein said client application comprises at least one client task, wherein the means for managing comprises:
  means for interleaving, in said radio communication software stack, at least a first client interrupt manager, that is part of said client application and that has an execution priority level that is higher than said at least one radio communication task and lower than said radio communication interrupt manager; and
  means for processing interruptions wherein:
    an interruption intended for the radio communication interrupt manager is entirely processed without the possibility of it being interrupted by an interruption intended for said first client interrupt manager;
    an interruption intended for the first client interrupt manager is only processed when there are no other jobs in progress being processed by said radio communication interrupt manager, and the processing of said interruption by said first client interrupt manager is interrupted by an arrival of an interruption intended for said radio communication interrupt manager.

12. The radio communication circuit according to claim 11, wherein said radio communication interrupt manager comprises code such that the duration of execution of said radio communication interrupt manager is compatible with a real time execution of said first client interrupt manager.

13. The radio communication circuit according to claim 11, wherein said first client interruption manager comprises code such that the duration of execution of said first client interruption manager is compatible with a correct execution of said at least one radio communication task.

14. The radio communication circuit according to claim 11, wherein said client application comprises at least two client task sub-assemblies,
  which each comprises at least one client task, and the circuit comprises means for managing said at least two client task sub-assemblies permitting, in said radio communication software stack, to separate said at least two client task sub-assemblies by at least one radio communication task.

15. Radio communication circuit according to claim 14, wherein the means for executing at least one of said client task sub-assemblies comprise means for executing a specific client task forming a third client interrupt manager which receives at least one interruption by at least one of said first and second client interrupt managers.

16. The radio communication circuit according to claim 11, wherein said client interruptions belong to the group comprising:
  client interruptions that are external to said radio communication circuit; and
  client interruptions that are internal to said radio communication circuit, comprising interruptions from a clock register that is part of said radio communication circuit.

17. The radio communication circuit according to claim 11, wherein the maximum duration of execution of each critical process required for design of at least one of said first and second client interrupt managers and/or at least one of said client tasks is pre-determined.

18. The radio communication circuit according to claim 11 and further comprising means for controlling duration of execution of at least one of said first client interrupt managers and/or at least one of said client tasks, thus guaranteeing that said the execution duration does not exceed a maximum determined duration.

19. The radio communication circuit according to claim 11 and further comprising an electronic radio communication module designed to be integrated into a radio communication device.

* * * * *